United States Patent
Lucas et al.

(10) Patent No.: US 6,896,215 B2
(45) Date of Patent: May 24, 2005

(54) DEVICE FOR BALE GROUPING AND SHREDDING OF FODDER AND BALED PRODUCTS

(75) Inventors: Gerard Lucas, La Verrie (FR); Jean-Claude Retaillaud, La Verrie (FR)

(73) Assignee: Lucas G, La Vierre (FR)

( * ) Notice: Subject to any disclaimer, the term of this patent is extended or adjusted under 35 U.S.C. 154(b) by 217 days.

(21) Appl. No.: 10/168,798

(22) PCT Filed: Dec. 21, 2000

(86) PCT No.: PCT/FR00/03652

§ 371 (c)(1),
(2), (4) Date: Oct. 24, 2002

(87) PCT Pub. No.: WO01/47345

PCT Pub. Date: Jul. 5, 2001

(65) Prior Publication Data

US 2003/0075629 A1 Apr. 24, 2003

(30) Foreign Application Priority Data

Dec. 24, 1999 (FR) ............................................. 99 16697

(51) Int. Cl.[7] .............................. B02C 1/08; B02C 13/28
(52) U.S. Cl. .................... 241/277; 241/187; 241/189.1; 241/191; 241/605
(58) Field of Search .............................. 241/187, 189.1, 241/191, 192, 277, 278.1, 282.1, 292.1, 605

(56) References Cited

U.S. PATENT DOCUMENTS

| 3,208,491 | A |   | 9/1965  | Bliss                      |
|-----------|---|---|---------|----------------------------|
| 3,863,850 | A |   | 2/1975  | Freeman                    |
| 3,915,392 | A |   | 10/1975 | Kugler                     |
| 3,979,074 | A |   | 9/1976  | White et al.               |
| 3,999,674 | A |   | 12/1976 | Meitl                      |
| 5,368,238 | A |   | 11/1994 | Bergkamp et al.            |
| 5,556,041 | A | * | 9/1996  | Cheesman et al. .... 241/24.14 |
| 5,573,190 | A | * | 11/1996 | Goossen ................ 241/27 |
| 6,375,104 | B1| * | 4/2002  | Hruska ................. 241/189.1 |
| 6,659,377 | B1| * | 12/2003 | Coulter et al. ........... 241/60 |

FOREIGN PATENT DOCUMENTS

| DE | 31 41 603 | 4/1983  |
| FR | 2 450 039 | 9/1980  |
| FR | 2 718 604 | 10/1995 |
| FR | 2 774 855 | 8/1999  |
| WO | 95 28077  | 10/1995 |

* cited by examiner

*Primary Examiner*—Ed Tolan
(74) *Attorney, Agent, or Firm*—Young & Thompson

(57) ABSTRACT

A bale-grouping and shredding device includes at least a rotor (4) equipped with said discs whereof the periphery is smooth. The discs (12) are provided with cutting members in the form of sectioning pairs (11). The sectioning pairs are V-shaped and co-operate with the teeth (17) of the barrier (11) to cut up and drive the products.

15 Claims, 4 Drawing Sheets

DEVICE FOR BALE GROUPING AND SHREDDING OF FODDER AND BALED PRODUCTS

This application is a 35 USC 371 of PCT/FR00/03652 filed Dec. 21, 2000. Any inquiry concerning this communication should be directed to Ed Tolan whose telephone number is 571-272-4525.

BACKGROUND OF THE INVENTION

The present invention relates to a device for unraveling and shredding products intended for preparing seed for cattle or preparing litter therefor and, more specifically, products of the forage or straw type packaged as bales or products of the silage kind or the like.

DESCRIPTION OF THE RELATED ART

This device may, in particular, be incorporated into the body of a distribution machine of the kind described in the documents EP-A-384 791 and FR-A-2 727 280 in particular.

The trickiness of the operation of shredding bales of fodder is dependent on the nature of the material, that is to say the length of the fibers and their hardness and toughness.

All the solutions developed, as described in document U.S. Pat. No. 3,208,491 and in documents FR-2 718 604, WO 95 95/28077 and U.S. Pat. No. 2,774,855 in the name of the Applicant, tend to employ means which allow this bale-shredding operation to be performed to great effect.

SUMMARY OF THE INVENTION

The present invention proposes an unraveling and shredding device which is of a universal nature, that is to say that it makes it possible to unravel and shred, under optimum conditions, all kinds of bales, particularly bales of forage.

In order to achieve this result, the device comprises, on the one hand, at least one rotor and, in particular, a rotor equipped with members for cutting said bale and driving the fragments of forage or straw toward, for example, ejection and distribution means and, on the other hand, collaborating with said rotor equipped with cutting members, a barrier in the form of a harrow, whose task is to hold said bale back and/or to recirculate the products, this cutting rotor being equipped with at least one disk the periphery of which is plain and this plain disk collaborates with a tooth of said harrow, which tooth is placed in the same plane as the disk and forms a retaining front, thus avoiding the phenomena of clogging by facilitating the recirculation of the products in the body, which disk comprises, on its periphery, pairs of cutters or sections, which cutters or sections pass across the flanks of the tooth which collaborates with the periphery of the plain disk equipped with said cutters or sections.

This unraveling/shredding device tolerates all kinds of long, soft, hard forage and fibers, and other products, straw, silage. It may also have several rotors depending on the field of use.

BRIEF DESCRIPTION OF THE DRAWINGS

The invention is further detailed hereinafter in conjunction with the drawings which are appended by way of indication and in which.

DESCRIPTION OF THE PREFERRED EMBODIMENTS

Figure 1:
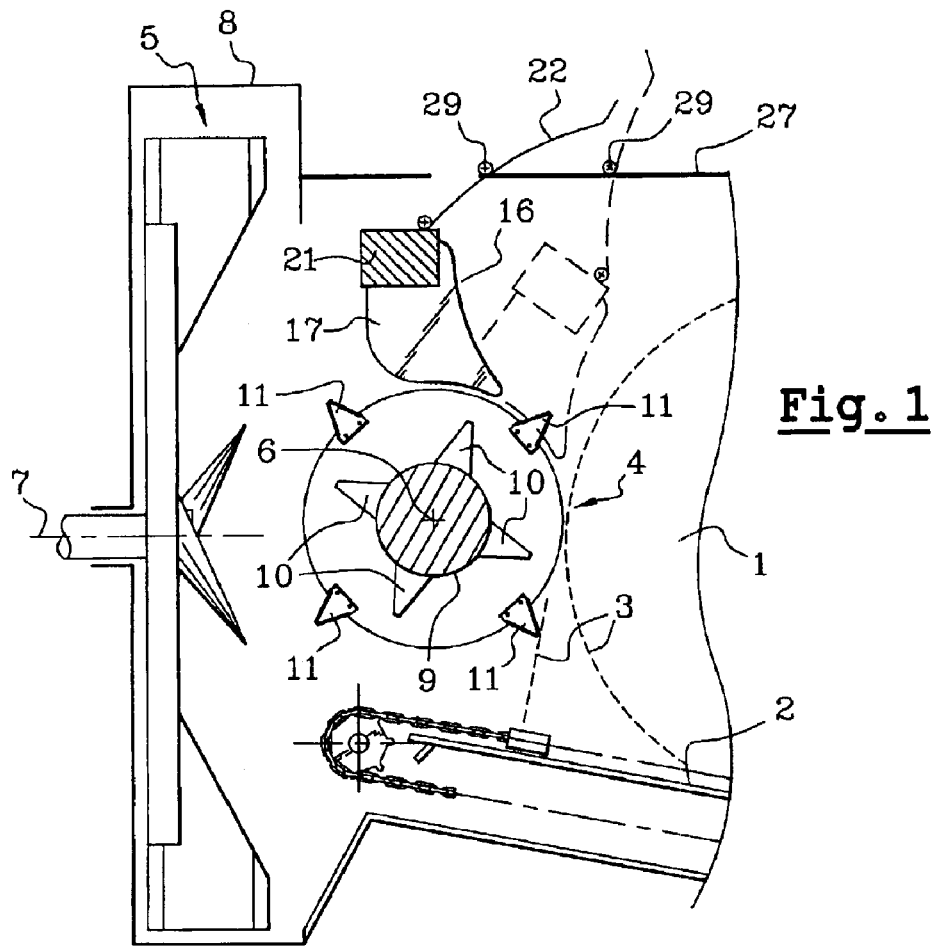
FIG. 1 depicts, schematically in longitudinal vertical section the unraveling/shredding device according to the invention incorporated, by way of example, into a machine which is depicted in part and which serves to distribute products of the forage or straw type for feeding cattle or for forming litter.

As depicted in FIG. 1, the unraveling/shredding device is incorporated, by way of example, into a machine consisting of a body 1 the bottom of which is equipped with a conveyor device 2 of the cross bar conveyor belt type. This belt allows a bale 3 depicted in the form of fine chain line, which is cylindrical or parallelepipedal, to be advanced, which bale travels toward the unraveling/shredding device consisting of a rotor 4 whose task is to break it into pieces.

The fragments are driven by the rotor 4 and, depending on the type of use, toward a blower 5, for example, arranged in the front part of the body.

The rotor 4 turns about a horizontal axis 6 perpendicular to the direction of travel of the bales 3. The blower 5 turns about a horizontal axis 7 which is perpendicular to the axis 6 of the rotor 4.

The blower 5 is arranged in a shroud 8 situated at the front of the body and allows the fragmented products to be ejected tangentially.

This type of machine may have one or several rotors 4 arranged one above the other, in front of the blower 5, all turning in the same direction as detailed later on.

In the exemplary embodiment of FIG. 1, the machine is depicted with just one rotor.

This rotor 4 comprises a cylindrical drum 9, the diameter of which may be chosen to offer a circumference of a length greater than the maximum length of the fibers of the product that is to be fragmented. This particular feature makes it possible to avoid the risks that fibers will become wound around the drum.

The drum 9 is equipped with appropriate means for unraveling, shredding and breaking up the bale by pulling the fibers and cutting them.

These means consist, for example, of pointed teeth 10 distributed around the periphery of the drum 9; they also consist of cutting members in the form of cutters or sections 11, distributed around the periphery of circular disks 12 each of which is positioned in a radial plane and which are distributed along the length of the drum 9.

Figures 2, 3:
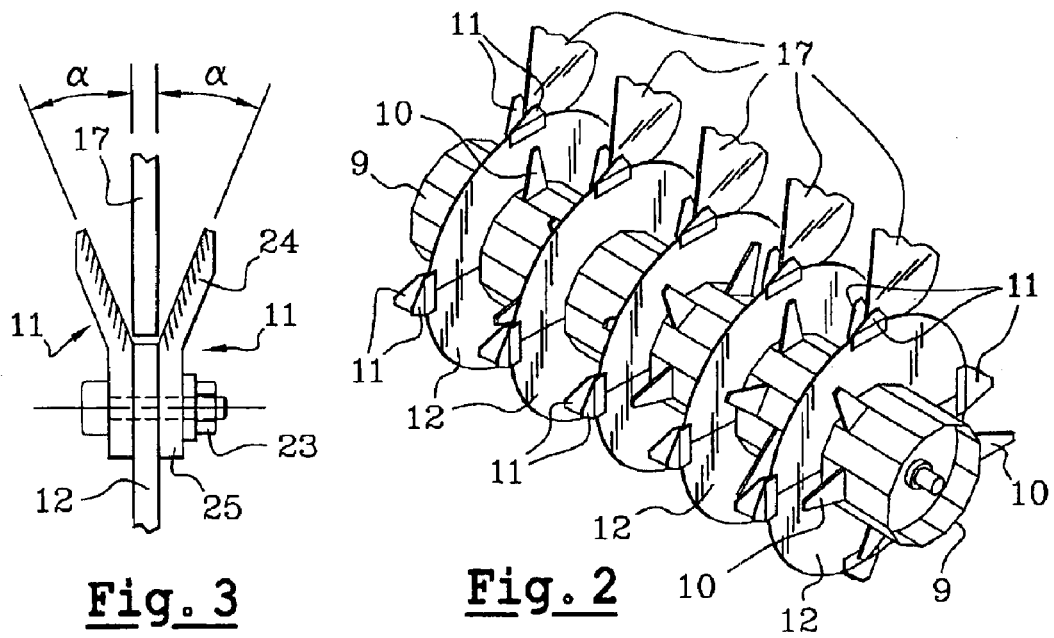
FIG. 2 shows, in perspective, an example of a rotor according to the invention.
FIG. 3 shows, in greater detail, a pair of sections fixed to a disk collaborating with a tooth.

As shown in FIGS. 1 and 2 in particular, the disks 12 are placed in register with a barrier 16 and, in particular, with the teeth 17 of this barrier. These teeth 17 are in the form of plates of sheet metal and are fashioned at their lower part to follow the contour of the disks 12, the periphery of which is plain, with the smallest possible clearance.

The role of this barrier 16 is to hold back excessively large chunks of product and recirculate them in the body.

The various teeth 17 are fixed to a beam 21 which is arranged over the rotor 4, leaving a passage opening the height of which approximately corresponds to the radius of said rotor.

A deflector 22, detailed later on, is placed above the beam 21 to guide the products that are to be recirculated in the body.

The teeth 17 together with the associated disks 12 form a veritable barrier. To cross this barrier, the fibers are cut or pulled by means of the teeth 10 or of the sections 11. The space or pitch between two adjacent teeth is chosen according to the field of use of the machine.

The sections 11 are distributed around the periphery of the disks 12. These sections 11 are arranged, as depicted in FIGS. 2 and 3, in pairs, one on each side of the disk 12; they are fixed together and fixed to the periphery of the disk 12 by bolts 23 or the like.

The thickness of the disk 12 is the same as, or even slightly greater than, that of the corresponding tooth 17. The sections 11 may be straight but, to avoid simply shearing the fibers, these sections 11 may form a kind of vee which extends on each side of each tooth 17, on the lateral faces of said tooth 17.

The angle α between the cutting part 24 of the section 11 and the tooth 17 or alternatively the plane of the disk 12 is between 0 and 45°; preferably of the order of 20°. The sections form a kind of dihedron and are joined in pairs at their heel 25 by means of the bolts 23 or the like.

Each disk may be equipped with three to twelve pairs of sections depending on the nature of the materials that are to be cut. These pairs of sections may also be offset from one disk with respect to another, so as to reduce or even eliminate vibration phenomena.

The barrier 16 may, depending on the field of use, be able to move about the rotor 4. Its beam 21 is, for example, fixed on lateral arms 26 which are partially depicted in FIG. 4 and these arms are guided appropriately with respect to the body 1 or with respect to the axis 6 of the rotor 4. It is thus possible, depending on the type and nature of the product to be distributed, for the output rate to be slowed or speeded up by altering the pass depth.

Starting out from normal, the amplitude of the movement of the barrier is of the order of 35 to 40° in the upstream direction, that is to say toward the entry to the body 1.

This movement of the barrier 16 about the rotor 4 is, for example, achieved by means of a ram, not depicted, or according to the means described in the document FR-A-2 718 604 by the Applicant. The movement of the barrier 16 may be accompanied by a movement and a pivoting of the deflector 22.

This deflector 22 is, for example, articulated on the beam 21 and guided on the upper lateral edges 27 of the body 1 by means of fingers 29 which stretch out laterally.

Thus, when the beam 21 of the barrier 16 moves, as depicted in fine chain line in FIG. 1, it takes with it the deflector 22 which tends to stand up if the beam 21 moves toward the entry to the body 1 whereas, conversely, the deflector tends to lay down when the beam 21 moves toward the blower 5.

Figure 4:
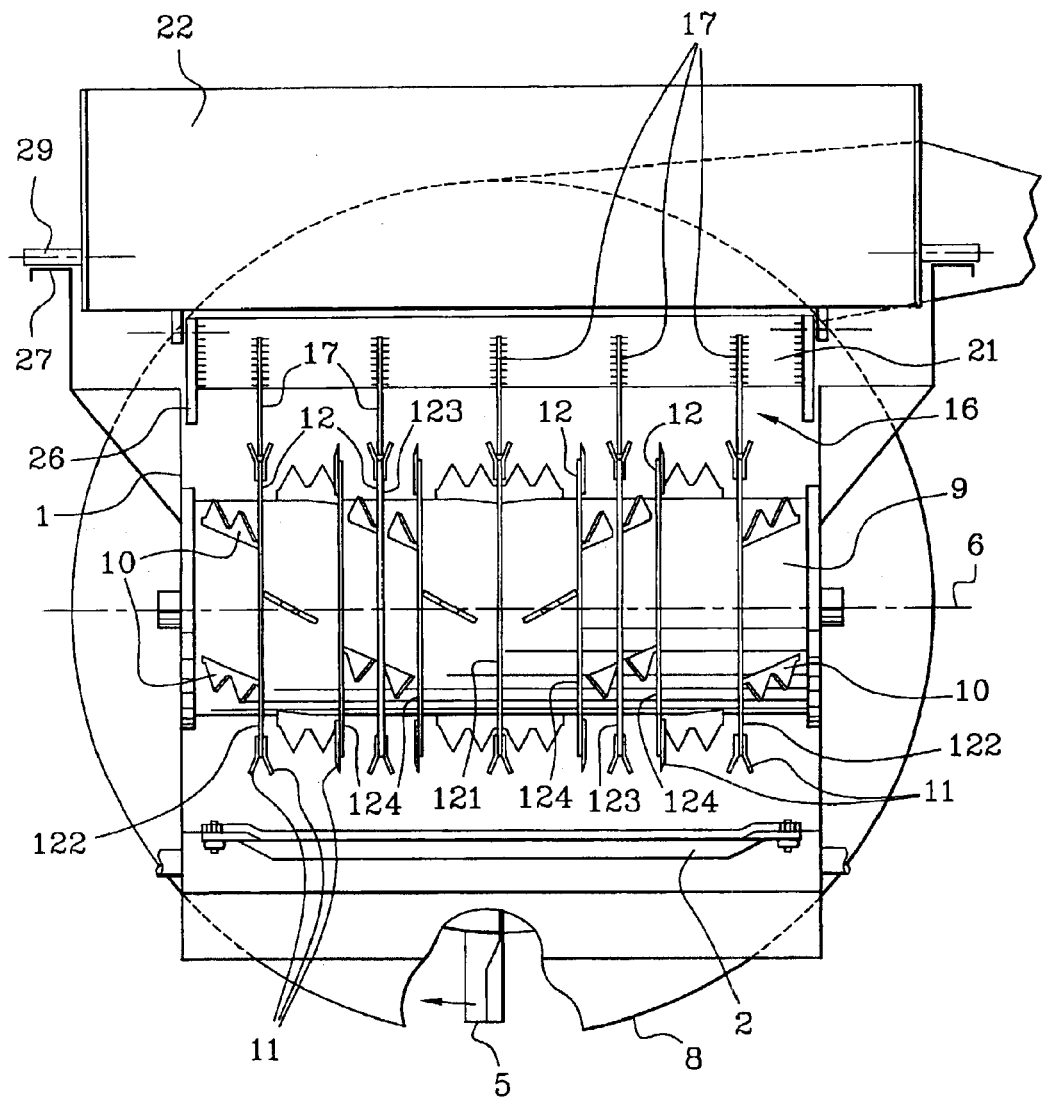
FIG. 4 is a rear schematic view of the machine depicted in FIG. 1, in addition depicting an alternative form of embodiment of the rotor.

FIG. 4 shows a rotor equipped with disks some of which collaborate with the teeth 17 of the barrier 16.

The disks 12 are distributed along the length of the rotor. There is a central disk 121 and lateral disks 122 which may, for example, have the same diameter.

Between these disks 121 and 122 there are disks 123 the diameter of which may be slightly smaller. On each side of the disks 123 there are disks 124 which have a diameter similar to that of the disks 121 and 122.

The disks 121, 122 and 123 are placed in register with teeth 17.

The disks 124, that is to say the disks which do not face teeth of the barrier 16, may have simple sections 11, that is to say straight sections. They may also have sections in the form of dihedra as with the other disks 121, 122 and 123.

Figure 5:
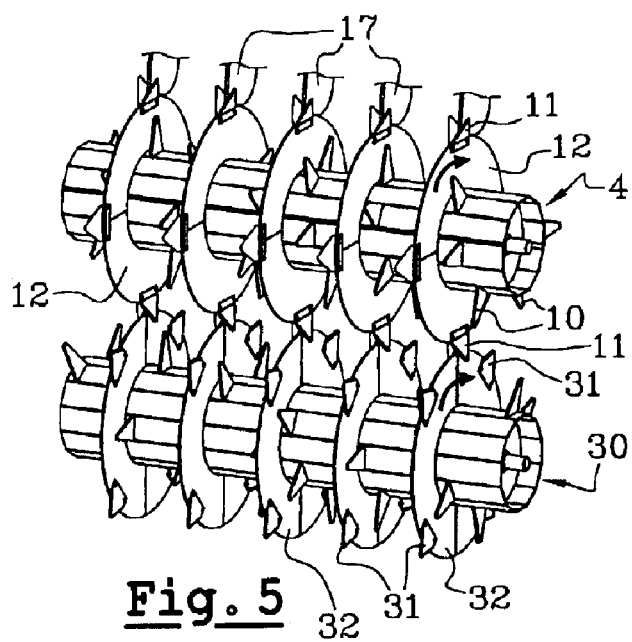
FIG. 5 depicts, in perspective, a pair of superposed rotors, the upper rotor of which collaborates with the teeth of a barrier.

FIG. 5 depicts an alternative form of embodiment of FIG. 2 and of FIG. 1, showing two superposed rotors the axes of rotation of which are mutually parallel: the upper rotor 4, as described in FIG. 2, the disks 12 of which are fitted with pairs of sections 11 and collaborate with the teeth 17, and the lower rotor 30 equipped also with disks 32. Each disk 32 of the rotor 30 comprises sections 31 bolted onto one of the faces of the disk, on one and the same side. These sections 31 lie in the plane of the disks 12 of the rotor 4 whereas the disks 32 are slightly offset from the disks 12 of said rotor 4.

The sections 31 form inside a circle which is tangential, with a reasonable operating clearance, with the periphery of the corresponding disk 12.

Figure 6:
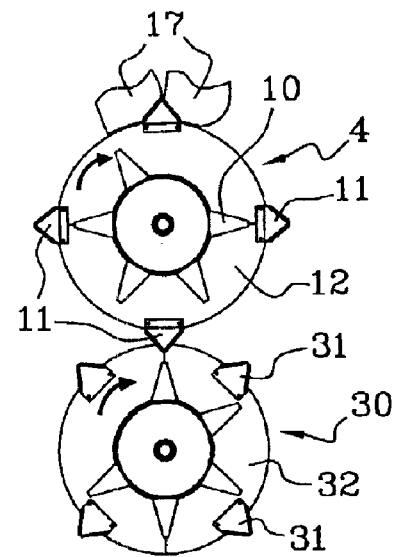
FIG. 6 is a side view of the two rotors depicted in FIG. 5.

The two rotors 4 and 30 turn in the same direction as depicted by the various arrows placed in FIG. 5 and FIG. 6.

The rotational speed of the rotors may differ. The speed of the lower rotor 30 is, for example, higher than that of the upper rotor 4. This difference in speed may be in a proportion of the order of 10 to 30% for example.

The lower rotor 30 may have, on its disks 32, a greater number of sections 31 than the pairs of sections 11 arranged on the disks 12 of the rotor 4. In this way, cutting of the products which then pass between the two rotors 4 and 30 is obtained, and this has the effect of spreading the delivery of cut product between, on the one hand, said rotors 4 and 30 and, on the other hand, the upper rotor 4 and the barrier 16.

Depending on the products to be treated, it is also possible to have fewer disks 32 on the rotor 30 by comparison with the rotor 4. Thus, in FIG. 5, the rotor 30 may have two or three disks distributed along its length but which remain in register with the corresponding disks 12 of the rotor 4.

FIG. 6 shows, viewed from the side, the rotor 4 and the rotor 30. At the upper part of the rotor 4 there are the teeth 17, which teeth can move over a circular sector as detailed beforehand in FIG. 1.

The lower rotor 30 comprises, like the upper rotor 4, pointed teeth 10 distributed around the periphery of the drum.

Figure 7:
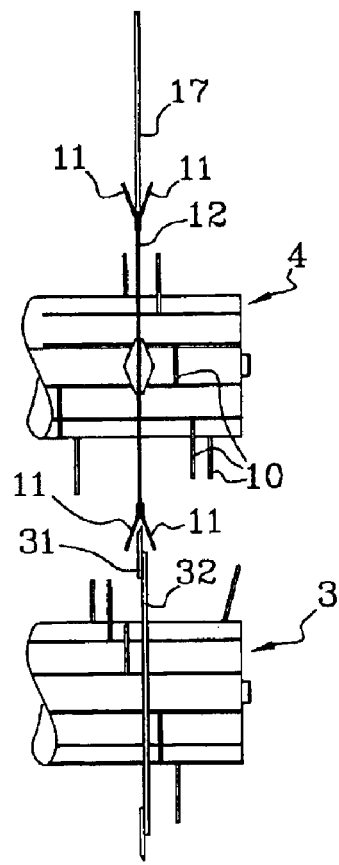
FIG. 7 depicts, in part and in greater detail, the positioning of the disks and of the teeth of the lower rotor with respect to the upper rotor.

FIG. 7 depicts, in greater detail, viewed face-on, the upper rotor 4 the disk 12 of which collaborates with a tooth 17, which tooth lies in the plane of the disk 12. The lower rotor 30 comprises a disk 32 equipped with sections 31. These sections 31 lie in the plane of the upper disk 12. The lower disk 32 is slightly offset laterally with respect to the upper disk 12.

The number of sections installed on each disk of the two rotors 4 and 30 may vary as necessary, from three to twelve pairs for example, in the case of the rotors 4 and 30.

Figure 8:
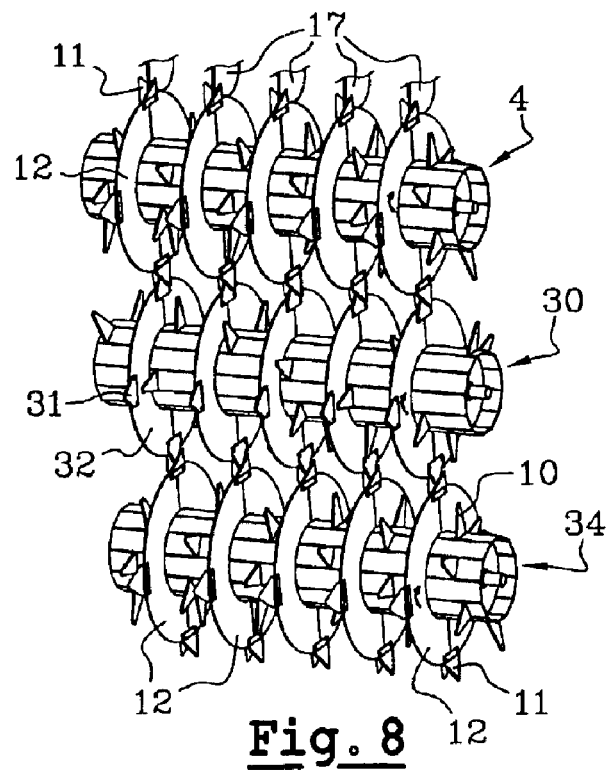
FIG. 8 depicts another embodiment consisting of three superposed rotors, that is to say of an upper rotor collaborating with the teeth of the barrier, an intermediate rotor and a lower rotor which is identical to said upper rotor.

FIG. 8 shows an alternative form which consists in an addition of a lower rotor 34. This lower rotor 34, like the upper rotor 4, has disks 12 and, on their periphery, pairs of sections 11. The rotor 30 acts as an intermediate rotor.

The three rotors turn in the same direction and form a substantial shredding and cutting front. Their rotational speed differs, decreasing from the bottom upward. The lower rotor 34 turns more quickly than the intermediate rotor 30 and said rotor 30 turns more quickly than the upper rotor 4. The difference in speed between two adjacent rotors is in a proportion of 10 to 30%. Here again, the intermediate rotor 30 may have more sections 31 than the rotors 4 and 34.

Because of its rotational speed which exceeds that of the rotor 4, the rotor 30 drives some of the products which have been shredded between the pairs of sections 11 of said rotor 4 and the sections 31.

The phenomenon is the same between the rotor 34 and the intermediate rotor 30; the rotor 34 also plays its part in delivering unraveled and shredded products.

The lower rotor 34 may also have a reduced number of disks 12, either a number equal to that of the upper rotor 30, or a lower number, depending on the field of use and on the products that are to be shredded.

Figure 9:
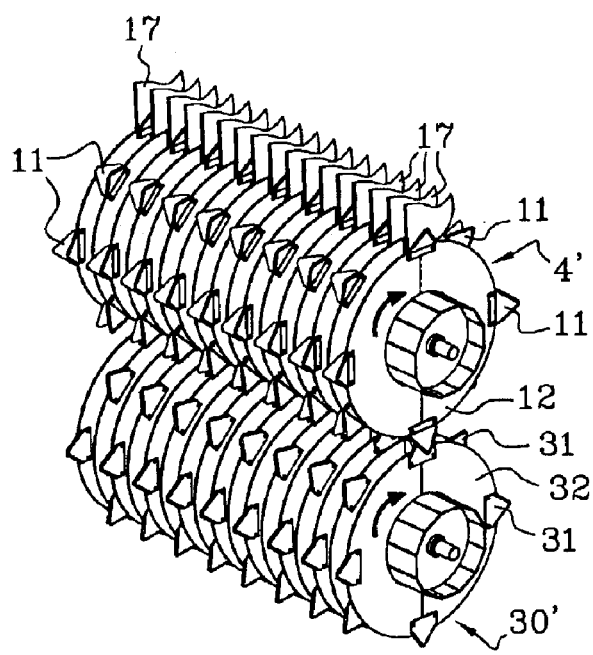
FIG. 9 depicts an alternative form of embodiment of the rotors of FIG. 5 with a view to unraveling and shredding into fine particles using a great many disks equipped with sections.

FIG. 9 depicts an alternative form of FIG. 5 showing a pair of rotors equipped with a multitude of disks which allow bales of forage or straw to be shredded and cut very finely.

The upper rotor 4' is equipped with disks 12, the periphery of which collaborates with teeth 17, as before. The number of teeth and the number of disks is tailored to the desired end product and the intended use of the machine.

Each disk 12 has pairs of sections 11 bolted at its periphery, which sections 11 pass on each side of the corresponding teeth 17.

Each disk 12 may comprise between three and twelve pairs of sections for example. Two adjacent disks are, for example, arranged in such a way as to angularly offset the pairs of sections so that they are positioned in a staggered configuration.

The lower rotor 30' comprises disks 32 equipped, on one of their sides, with sections 31. The number of sections 31 may exceed the number of pairs of sections 11 arranged on the rotor 4. Two adjacent disks 32 of the rotor 30' may be angularly offset so as also to place the sections in a staggered configuration.

As detailed previously in FIG. 7, the teeth 31 of the disks 32 of the rotor 30' are in the plane of the disks 12 of the rotor 4'.

Here again, as in FIG. 5, the number of disks on the lower rotor may be lower than the number of disks on the upper rotor.

Figure 10:
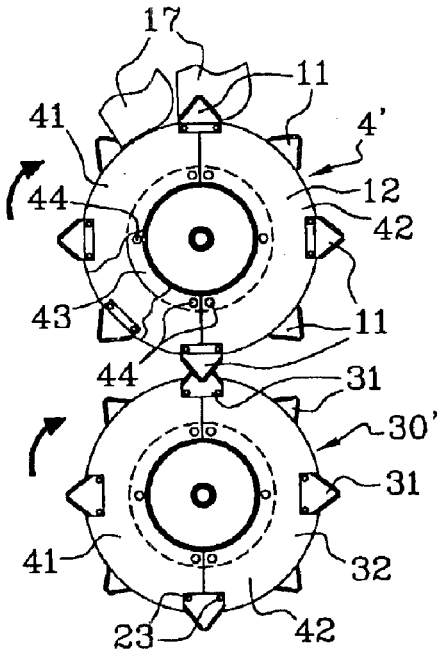
FIG. 10 is a side view of FIG. 9 which also shows a particular feature of the disks and their connection to the rotor.

FIG. 10 shows the superposed rotors 4' and 30' and the teeth 17 of the barrier, in two different positions, as explained beforehand.

The way in which the disks are mounted is illustrated in this figure. The disks 12, 32 actually consist of two parts in the form of half-rings. Each half-ring 41, 42 is joined to an adapter collar 43 by any appropriate means, bolts 44 or the like, and they are also joined together by means of the bolts 23, for example, of the pairs of sections 11 or of the sections 31, as the case may be, at their ends.

The adapter collars 43 are in the form of small rings which are welded onto the drum that constitutes the rotor. These rings 43 are distributed along the length of the rotor and make it possible to fit the number of disks 12, 32 needed depending on the field of use and on the products that are to be shredded.

This constructional arrangement applies to all the rotors, whether there be just one single rotor or a great many, three, four or more, rotors.

Figure 11:
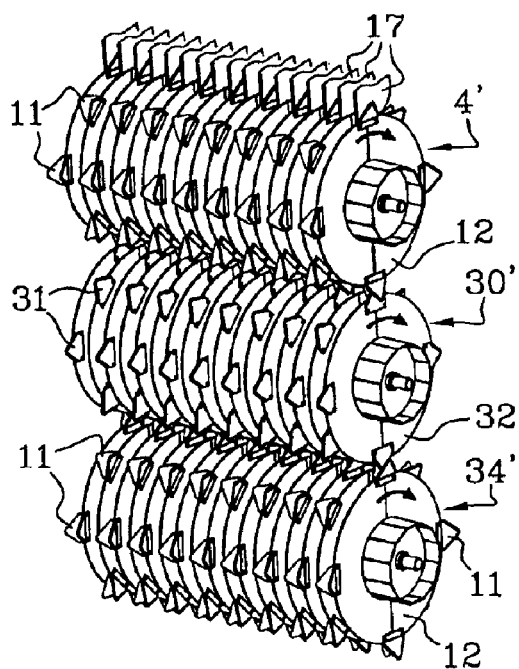
FIG. 11 is an alternative form of FIG. 9 with three superposed rotors.
Figure 12:
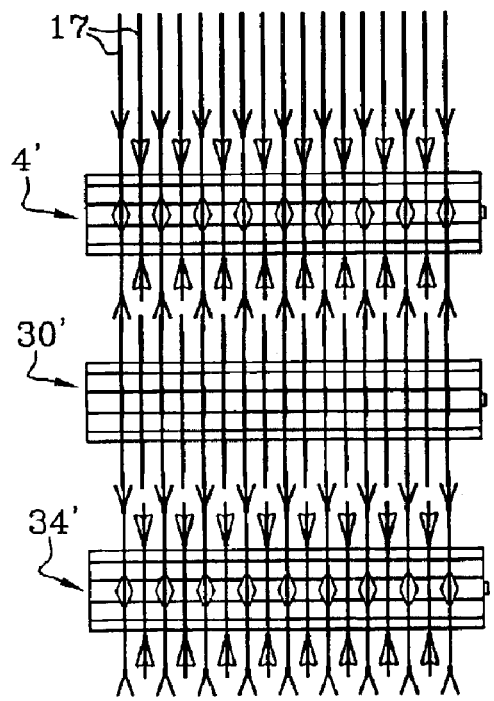
FIG. 12 shows, viewed from face-on, the three superposed rotors of FIG. 11 and the teeth arranged at the upper part, collaborating with the upper rotor.

FIG. 11 depicts an alternative form of the unraveling/shredding device which comprises three superposed rotors, and FIG. 12 is a front-on view of FIG. 11 showing the shredding and cutting front consisting of the three superposed rotors and of the teeth 17 arranged at the upper part.

The three rotors 4', 30' and 34' turn in the same direction as indicated by the arrows in FIG. 11 and may turn at different speeds as indicated previously.

The number of disks may decrease between the upper rotor and the lower rotor as mentioned previously.

In general, the barrier 16 has as many teeth 17 as the upper rotor has disks. The pitch between two adjacent teeth is in fact chosen according to the field of use of the machine and the desired level of fragmentation of the products. It is, for example, of the order of 30 to 300 mm.

Depending on the diameter and the size of the rotors, it is also possible to produce a cascade of rotors, alternating rotors with disks identical to the upper rotor 4 or 4', and rotors with disks identical to the rotor 30 or 30'. These rotors in a cascade configuration can also turn at different speeds, the speeds decreasing starting from the lower rotor, so as to spread the delivery between the adjacent rotors and between the upper rotor and the barrier 16.

When several rotors are superposed, for example in a cascade, the number of disks can differ from one rotor to another, decreasing starting from the upper rotor; the straight sections 31 remain placed in the plane of the disks carrying the pairs of sections 11.

What is claimed is:

1. A device for unraveling/shredding products of the forage type, packaged in bales, comprising:
at least one rotor (4) equipped at least with members for cutting said bale,
a barrier (16) in the form of a harrow, equipped with teeth (17) to hold said bale back and/or to recirculate the products,
said rotor (4) comprising at least one disk (12) the periphery of which disk is plain and circular,
which disk collaborates with one of the teeth (17) of said harrow,
which one tooth is placed in the same plane as the disk and the assembly forms a retaining front,
said disk (12), on either side of the plane of the disk, having associated cutting members consisting of pairs of cutters or sections (11), said associated cutters or sections arranged in pairs and each extending at an angle compared with the plane of the disk (12) and the associated one tooth (17), in order to form a cutting Vee open on the one tooth (17) with which the disk (12) bearing said pair collaborates.

2. The unraveling/shredding device as claimed in claim 1, characterized in that the pairs of cutters or sections (11) are fixed on the disk (12).

3. The unraveling/shredding device as claimed in claim 2, characterized in that the angle of the face of the sections (11) with respect to the lateral surface of the tooth (17) and with respect to the plane of the disk on which they are mounted, is between 0 and 45°.

4. The unraveling/shredding device as claimed in claim 1, characterized in that it comprises an additional rotor (30) comprising disks (32), which discs are equipped with straight sections (31) fixed on one and the same flank of the disk, which sections lie in the plane of each corresponding disk (12) of the rotor (4).

5. The unraveling/shredding device as claimed in claim 4, characterized in that the rotors turn in the same direction at different speeds in a proportion of the order of 10 to 30%, the lower rotor turning more quickly than the upper rotor.

6. The unraveling/shredding device as claimed in claim 4, characterized in that the rotor (30) has a number of sections (31) which is greater than the pairs of sections (11) of the upper rotor (4).

7. The unraveling/shredding device as claimed in claim 5, characterized in that it comprises a cascade of rotors turning in the same direction at different speeds decreasing from the lower rotor to the upper rotor, which rotors comprise, in alternation, either disks with pairs of sections (11) like the upper rotor, or disks with straight sections (31).

8. The unraveling/shredding device as claimed in claim 4, characterized in that the number of disks on the superposed rotors differs, decreasing starting with the upper rotor, the straight sections (31) remaining placed in the plane of the corresponding disks equipped with the pairs of sections (11).

9. The unraveling/shredding device as claimed in claim 1, characterized in that the rotor or rotors equipped with disks comprise adapter collars (43) distributed along their length and welded to the cylindrical drum of said rotor, which collars allow the disks to be mounted, which disks are in the form of two half-rings (41, 42), which half-rings are joined to said adapter collars and are joined together by the sections or pairs of sections positioned where they meet.

10. The unraveling/shredding device as claimed in claim 1, characterized in that the harrow-form barrier (16) has teeth (17) distributed at a pitch of between 30 and 300 mm.

11. The unraveling/shredding device as claimed in claim 1, adapted to a machine for dispensing and/or mixing products, characterized in that the barrier (16) is arranged at the upper part of the body of said machine above the upper rotor (4), which barrier can move around said rotor (4) over a portion of its periphery the amplitude of which is of the order of 35 to 40° starting from the normal and moving upstream toward the inlet to said body.

12. The unraveling/shredding device as claimed in claim 11, characterized in that the barrier (16) comprises, at its upper part, a deflector flap (22) articulated and guided on the upper rim of the body, so as to alter the angle of the path of the recirculated products according to the position of said barrier (22) with respect to the rotor (4).

13. The unraveling/shredding device as claimed in claim 2, characterized in that the angle of the face of the sections (11) with respect to the lateral surface of the tooth (17) and with respect to the plane of the disk on which they are mounted, is of the order of 20°.

14. A device for unraveling/shredding bales of forage products, comprising:
   at least one rotor (4) equipped with bale cutting members;
   a harrow (16), equipped with teeth (17), to hold and recirculate the bales;
   the rotor (4) comprising at least one disk (12) with a plain and circular periphery,
   the disk collaborating with one tooth (17) of the harrow,
   the disk and the one tooth located in a common plane; and
   a retaining front comprising the disk,
   the disk (12), on either side of the common plane, having associated cutting members comprising pairs of cutters or sections (11), the associated pairs of cutters or sections being arranged in pairs each extending at an angle with respect to the plane of the one tooth (17) and forming a cutting Vee open on the one tooth (17) with which the disk (12) bearing the pair of associated cutters or sections collaborates.

15. A device for unraveling/shredding bales of forage products, comprising:
   a rotor (4) equipped with bale cutting members; and
   a harrow (16), equipped with teeth (17), to hold and recirculate the bales,
   the rotor (4) comprising at least one disk (12) with a circular periphery,
   the disk collaborating with one tooth (17) of the harrow,
   the disk and the one tooth located in a common plane,
   the disk (12), on either side of the common plane, having associated cutting members comprising pairs of cutters (11), each cutter of one associated pair of cutters being positioned on opposite sides of the one tooth and extending at an angle with respect to the common plane to form a cutting Vee with the one tooth intermediate the associated pair of cutters.

* * * * *